United States Patent [19]

Fabbro

[11] Patent Number: 4,694,816
[45] Date of Patent: Sep. 22, 1987

[54] GRILLE APPARATUS
[75] Inventor: Miguel Fabbro, Miami, Fla.
[73] Assignee: Bifa Corporation, Miami Beach, Fla.
[21] Appl. No.: 785,531
[22] Filed: Oct. 8, 1985
[51] Int. Cl.⁴ ............................................. A47J 37/00
[52] U.S. Cl. .................................... 126/41 R; 126/27;
126/51; 99/444; 220/369
[58] Field of Search ................ 126/41 R, 25 R, 25 A,
126/29, 41 D, 51, 27, 373, 376, 377, 378, 348;
220/368, 369, 370, DIG. 6; 99/444

[56] References Cited
U.S. PATENT DOCUMENTS

| | | | |
|---|---|---|---|
| 2,093,013 | 9/1937 | Jennings | 126/369 X |
| 3,212,426 | 10/1965 | Lewis | 126/369 X |
| 3,528,401 | 9/1970 | Moore | 126/369 |
| 4,094,295 | 6/1978 | Boswell . | |
| 4,509,412 | 9/1985 | Whittenburg et al. | 126/369 X |

Primary Examiner—Larry Jones
Attorney, Agent, or Firm—Jesus Sanchelima

[57] ABSTRACT

A grille apparatus that has a base member with the shape of a plate and a central opening within which a stove burner is positioned. A grille assembly, having several spacing members mounted on its underside, rests on the base member slightly above it and leaving a clearance between the grille assembly and the base member. The grille assembly is covered with cover that has a handle. The base member has a channel underlying the area where the food rests on the grille assembly and the channel is filled with water so that the grease that drips down is collected in the water filled channel.

5 Claims, 6 Drawing Figures

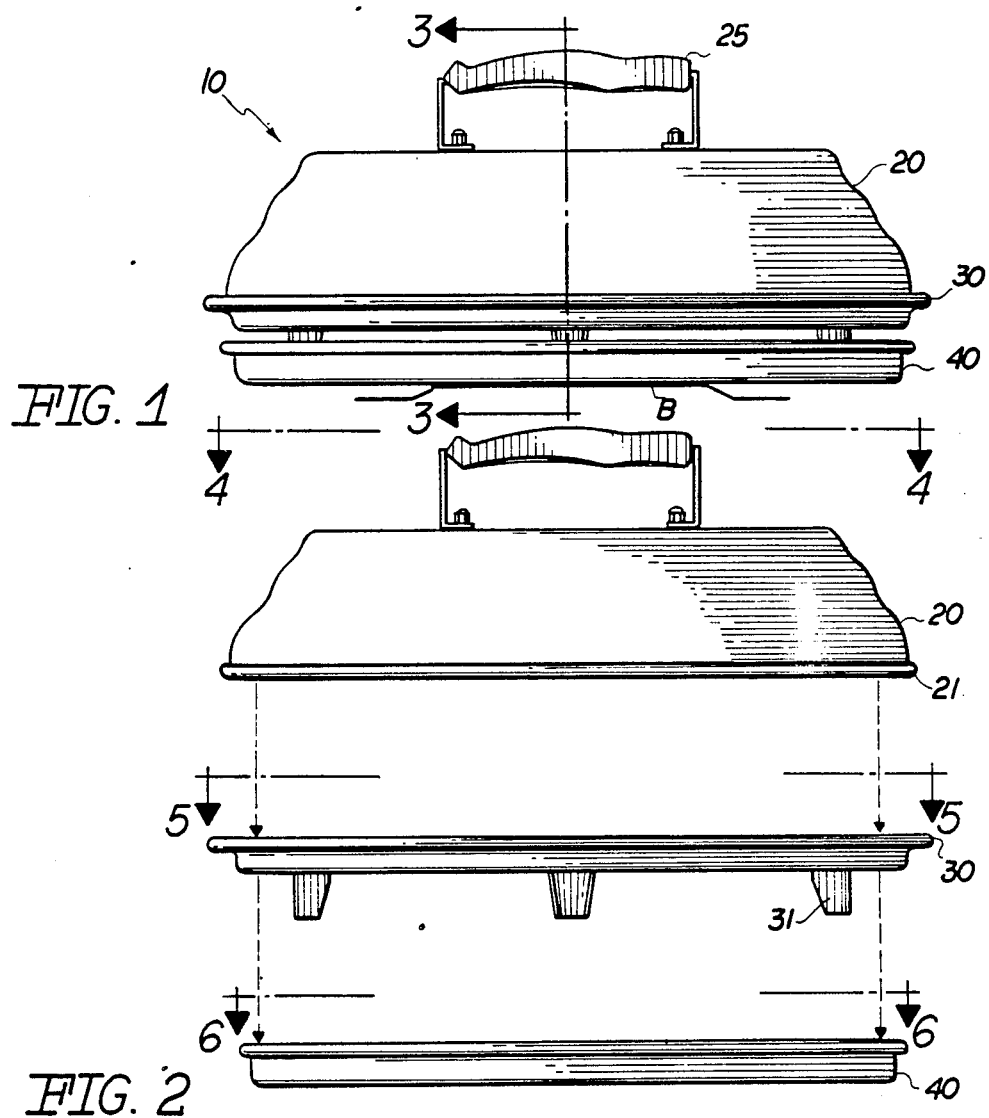
FIG. 1
FIG. 2
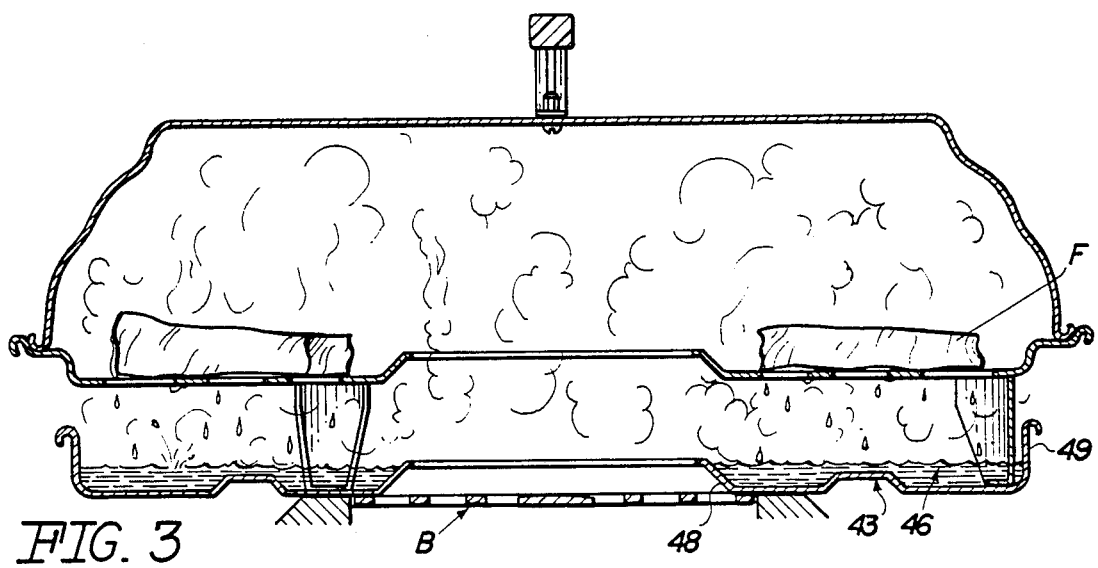
FIG. 3

GRILLE APPARATUS

BACKGROUND OF THE INVENTION

1. Field of the Invention

The present invention relates to grills and more particularly to grills that can be adapted to conventional gas or electric ranges.

2. Description of the Prior Art

The desirability of cooking food with a minimum of oil or fat has always made grills superior from a health standpoint. One drawback, however, has been that usually these grills use charcoal thereby introducing carbon compounds and other chemicals in the food. One of these devices is disclosed in U.S. Pat. No. 4,094,295 issued to Burl Boswell and Heyman J. Manhein in 1978. The present does not require charcoal and it is designed to work with conventional gas and electric ranges. The fat or grease that drips off the food being cooked falls on a circular channel with water underlying the grille where the food rests thereby facilitating the cleaning of the apparatus afterwords.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a device that is capable of working with conventional gas and electric ranges that provide a source of clean energy.

It is still another object of the invention to provide a grille apparatus that is easy to operate and efficiently consumes only the necessary energy to cook the food.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents the present invention assembled as it would be used on a stove burner.

FIG. 2 shows the grille apparatus, disassembled, showing its three main members.

FIG. 3 illustrates a cross-sectional view of the apparatus along line 3—3.

DETAILED DESCRIPTION OF THE PREFERRED EMBODIMENT

Figure 4:
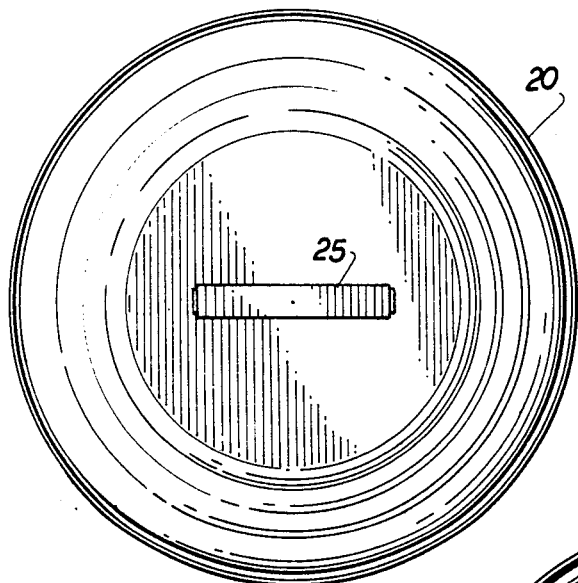
FIG. 4 is a top view, along line 4—4 in FIG. 2, of the cover member.
Figure 5:
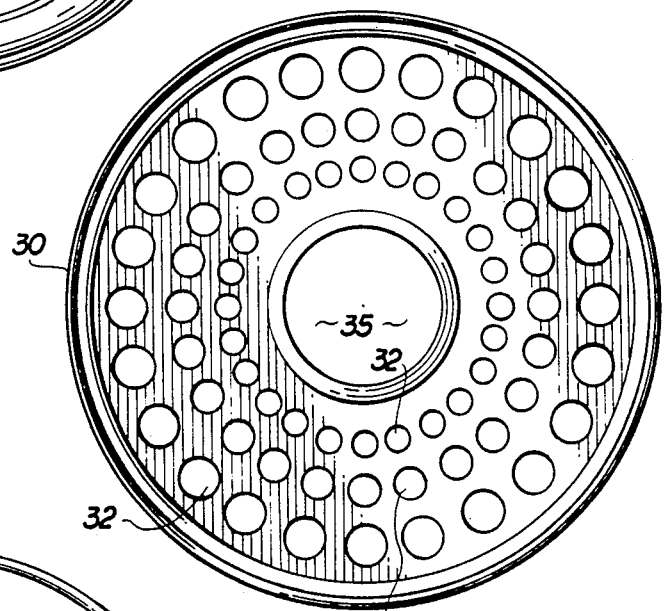
FIG. 5 is a top view, along line 5—5 in FIG. 2, of the grille member.
Figure 6:
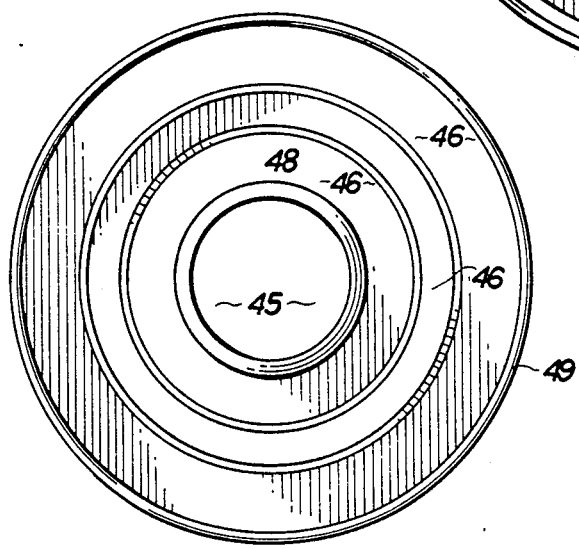
FIG. 6 is a top view, along line 6—6 in FIG. 2, of the base member.

FIG. 1 shows the general appearance of the preferred embodiment of the present invention which is generally referred to with numeral 10. Grille apparatus 10, basically, includes three parts: cover 20, grille assembly 30 and base member 40. Cover 20 has, in the preferred embodiment, a hemispheric shape with a handle 25 mounted on its upper end, as shown in FIG. 4. Base 40 is substantially a circular plate with a central opening 45 and upwardly extending outer flange 48 and inner flange 49 thereby defining an annular channel 46 where a shallow body of water may be deposited, as shown in FIG. 5. Grille assembly 30 has substantially the shape of a circular plate with a diameter that is slightly smaller than the diameter of base 40 so that grille assembly 30 may rest within base 40. Grille assembly 30 includes central opening 35 and several holes 32 scattered throughout its surface and being of sufficient number to allow the grease of the food being cooked to drip down to base member 40. In the preferred embodiment, the diameters of holes 32 are larger as their position is farther away from the center thereby maintaining their radial alignment while providing enough holes to let the dripping grease from the food to go through and keeping the food in place. Spacers 31 are mounted to the underside of grille assembly 30 to maintain it in a spaced apart relationship with base member 40, as shown in FIG. 3.

To use, base member 40 is positioned so that stove burner B is aligned within opening 45. The annular channel 46 defined by flanges 48 and 49 is filled with water, as shown in FIG. 3. Annular rib 43 provides better structural integrity to base member 40. Grille assembly 30 is then positioned over base member 40 with spacers 31 well within flange 48 so that rim 21 of cover 20 may evenly fit also adjacent to the inner wall of flange 48. Food F rests on grille assembly 30 and its grease, fat and other liquids drip down to channel 46 as it is being cooked. This makes it easier to clean afterwords since the grease does not mix with the water and it does not fall on the hot metal parts as in conventional grilles.

With grille apparatus 10, the food is efficiently cooked in a virtually odorless and smoke environment since there is no charcoal and the grease that otherwise would produce smoke in a conventional grille is collected in the water filled channel for easy subsequent disposal. The heat utilized is kept and efficiently utilized by apparatus 10 thereby minimizing the energy consumption.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A grille apparatus for cooking food with electric or gas stove burners, comprising:

A. a base member having substantially the shape of a plate with a central opening of sufficiently large dimensions to house said burners and further having an inner upwardly extending flange around the periphery of said central opening and an outer upwardly extending flange around the outer periphery of said plate so that a channel is defined outside the heating range of said burners and further including sufficient water to substantially fill said channel;

B. a grille assembly having substantially the shape of a plate including a center hole having substantially the same dimensions as said central opening and said grille assembly includes a plurality of orifices scattered throughout so that the grease of said food resting on said grille assembly may drip down to said water filled channel and further including a plurality of spacer members mounted to the underside of said grille assembly so that a space apart relationship is kept between said assembly and said base member; and C. a cover member being of slightly smaller dimensions than said grille assembly and which interfits with said grill assembly so that it can tightly cover said food thereby allowing the heated air entering the central opening of the base member to cook food placed upon the grill assembly and retain the heat in the apparatus.

2. The grille apparatus set forth in claim 1 further wherein said base member includes an annular rib positioned between said inner and outer flanges to provide mechanical integrity to said base member.

3. The grille apparatus set forth in claim 2 wherein said cover member includes a handle.

4. The grille apparatus set forth in claim 3 wherein said base member, grille assembly and cover member have a substantially circular peripheral shape.

5. The grille apparatus set forth in claim 1 wherein the grease that drips off said food when cooked falls on said water filled channel thereby facilitating cleaning said apparatus and avoiding smoke production.

* * * * *